(12) United States Patent
Locker et al.

(10) Patent No.: US 8,055,893 B2
(45) Date of Patent: Nov. 8, 2011

(54) TECHNIQUES FOR BOOTING A STATELESS CLIENT

(75) Inventors: Howard Locker, Cary, NC (US); Richard Wayne Cheston, Morrisville, NC (US); Mark Charles Davis, Durham, NC (US); Rod D. Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 575 days.

(21) Appl. No.: 12/200,401

(22) Filed: Aug. 28, 2008

(65) Prior Publication Data

US 2010/0058042 A1   Mar. 4, 2010

(51) Int. Cl.
    *G06F 9/00*     (2006.01)
    *G06F 15/177*   (2006.01)
    *G06F 13/00*    (2006.01)
(52) U.S. Cl. ............. 713/2; 713/1; 709/222; 710/104
(58) Field of Classification Search .......... 713/1, 2; 709/222; 710/104
    See application file for complete search history.

(56) References Cited

U.S. PATENT DOCUMENTS

| | | | |
|---|---|---|---|
| 6,434,695 B1* | 8/2002 | Esfahani et al. | 713/2 |
| 6,742,025 B2* | 5/2004 | Jennery et al. | 709/220 |
| 7,318,148 B2* | 1/2008 | Scheibli | 713/1 |
| 7,418,588 B2* | 8/2008 | Lin et al. | 713/2 |
| 7,631,173 B2* | 12/2009 | Fausak | 713/1 |
| 7,793,090 B2* | 9/2010 | Zimmer et al. | 713/2 |
| 2008/0028052 A1 | 1/2008 | Currid et al. | |
| 2008/0209196 A1 | 8/2008 | Hernandez et al. | |
| 2008/0244096 A1 | 10/2008 | Springfield et al. | |
| 2009/0132797 A1* | 5/2009 | Lo | 713/2 |
| 2009/0327683 A1* | 12/2009 | Cabot et al. | 713/2 |

FOREIGN PATENT DOCUMENTS

| | | |
|---|---|---|
| GB | 2448012 | 10/2008 |
| WO | 00/54149 | 9/2000 |

OTHER PUBLICATIONS

Barham et al., Xen and the Art of Virtualization, SOSP'03, Oct. 19-22, 2003, pp. 1-14.*
Satyanarayanan, M. et al. "Pervasive Personal Computing in an Internet Suspend/Resume System" IEEE Internet Computing, vol. 11, 2007, Issued 2, pp. 16-25.—ISSN 1089-7801.

* cited by examiner

*Primary Examiner* — Stefan Stoynov
(74) *Attorney, Agent, or Firm* — Antony P. Ng; Yudell Isidore Ng Russell PLLC

(57) ABSTRACT

A technique for booting a stateless client includes booting a virtual machine (VM) monitor on the client. The VM monitor is stored in a non-volatile memory area of a memory subsystem (of the client) and a first portion of an operating system (which does not include any state information for the operating system) is stored in the non-volatile memory area of the client. Booting of the operating system for the client is initiated and a remote storage (that stores a second portion of the operating system that includes state information for the operating system) is accessed via a communication link. Booting of the operating system for the client is completed using the second portion of the operating system.

23 Claims, 2 Drawing Sheets

TECHNIQUES FOR BOOTING A STATELESS CLIENT

BACKGROUND

1. Field

This disclosure relates generally to booting a client and, more specifically to techniques for booting a stateless client.

2. Related Art

Small computer system interface (SCSI) standards define commands, protocols, and electrical and optical interfaces for physically connecting and transferring data between computers and peripheral devices. SCSI is most commonly used for hard disk drives and tape drives, but can connect a wide range of other devices, including scanners and compact disc (CD) drives. In computing, an Internet SCSI (iSCSI) protocol may be employed to allow clients (initiators) to send SCSI commands to SCSI storage devices (targets) at remote locations. In a typical implementation, iSCSI employs a transmission control protocol/Internet protocol (TCP/IP) suite for communication that allows two hosts to negotiate and then exchange SCSI commands using IP networks.

Generally, iSCSI is used to emulate SCSI over wide-area networks to create a storage area network (SAN). Unlike some SAN protocols, iSCSI does not require dedicated cabling and can be implemented over existing switching and IP infrastructure. Although iSCSI can communicate with arbitrary types of SCSI devices, system administrators usually use iSCSI to allow servers (such as database servers) to access disk volumes on storage arrays. iSCSI SANs are frequently employed to facilitate consolidation of storage resources across an organizational network to one or more central locations (e.g., data centers) to promote efficient storage allocation. In the context of computer storage, a SAN allows a client to use a network protocol to connect to remote storage resources, such as disks and tape drives on an IP network, for block level input/output (I/O).

From the point of view of class drivers and application software, SAN storage resources appear as locally attached storage devices. In general, employing an iSCSI boot facilitates localization and containment of hard disk drive (HDD) errors at a remote storage location (as diskless clients do not utilize local HDDs for booting), as well as the consolidation and streamlining of information technology (IT) management. Moreover, stateless clients may be readily reconfigured by booting the clients from different OS boot volumes, as needed.

In computing, a hypervisor (virtual machine monitor) is a virtualization platform that is typically utilized to execute multiple operating systems (OSs) simultaneously on a single computer system (client). Hypervisors are generally classified as a type 1 (native or bare-metal) hypervisor (which is software that runs directly on a given hardware platform, as an OS control program) that is a guest OS that runs at a second level above the hardware or a type 2 (hosted) hypervisor (which is software that runs within an OS environment) that is a guest OS that runs at a third level above the hardware.

SUMMARY

According to one or more embodiments of the present invention, a technique for booting a stateless client includes booting a virtual machine (VM) monitor on the client. Booting of an operating system (OS) for the client is initiated (using a first portion of the OS that is stored on the client) and a remote storage (that stores a second portion of the OS that includes state information for the OS) is accessed via a communication link. The VM monitor is stored in a non-volatile memory area (e.g., a first non-volatile memory) of a memory subsystem of the client and the first portion of the OS (which does not include any state information for the OS) is stored in the non-volatile memory area (e.g., in the first non-volatile memory or a second non-volatile memory) of the client. Booting of the OS for the client is completed using the second portion of the OS. In this case, the VM monitor functions as a control program for the OS.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
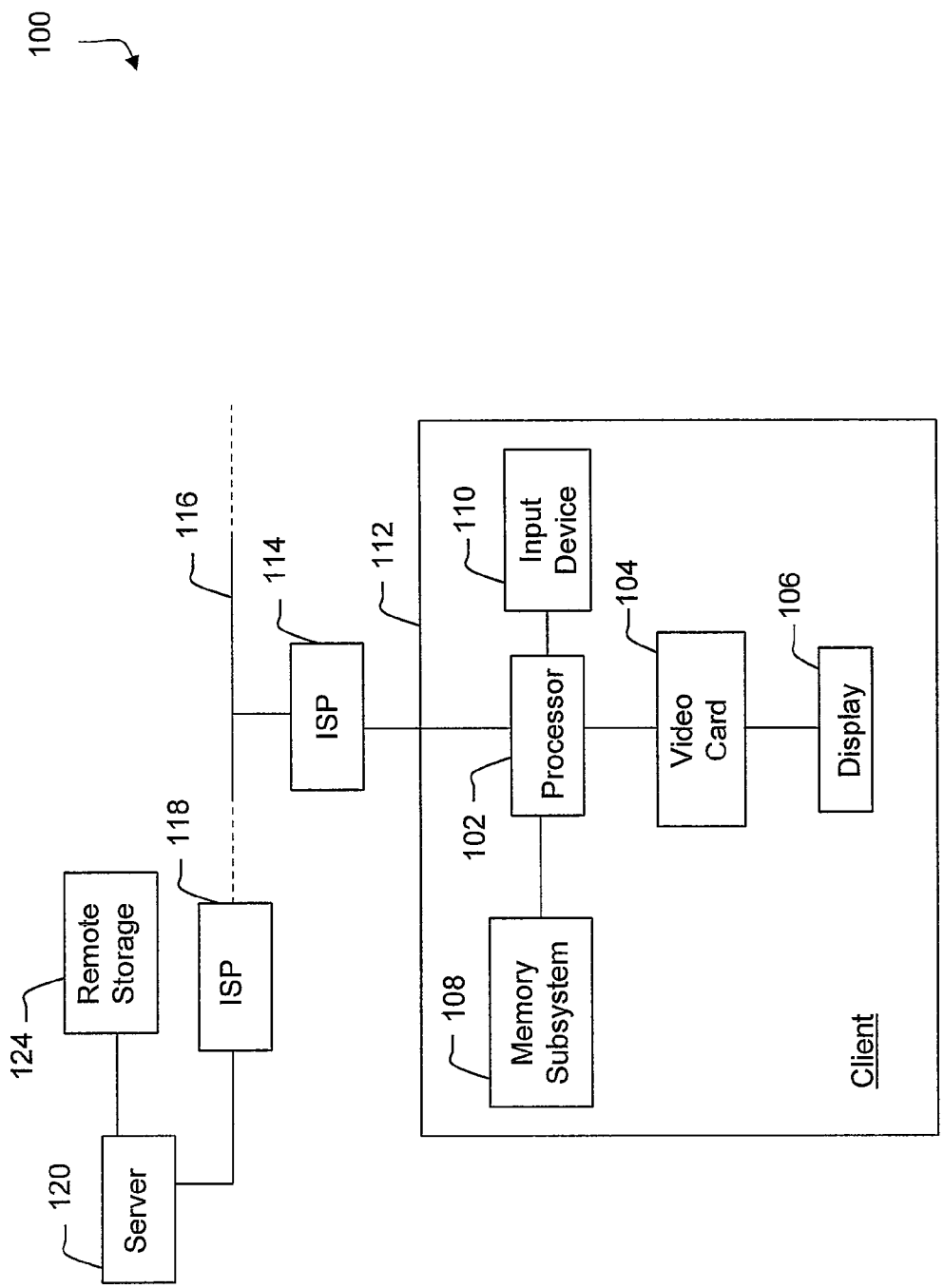
FIG. 1 is a block diagram of a relevant portion of an example computer network that includes a stateless client that accesses remote storage to retrieve a portion of an operating system, according to various embodiments of the present disclosure.

As will be appreciated by one of ordinary skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product on a computer-readable storage medium having computer-readable program code embodied in the medium.

Any suitable computer-usable or computer-readable storage medium may be utilized. The computer-usable or computer-readable storage medium may be, for example, but is not limited to, an electronic, magnetic, optical, electromagnetic, infrared, or semiconductor system, apparatus, or device. More specific examples (a non-exhaustive list) of the computer-readable storage medium includes the following: a portable computer diskette, a hard disk, a random access memory (RAM), a read-only memory (ROM), an erasable programmable read-only memory (EPROM) or flash memory, a portable compact disc read-only memory (CD-ROM), an optical storage device, or a magnetic storage device. Note that the computer-usable or computer-readable storage medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable storage medium may be any medium that can contain or store the program for use by or in connection with an instruction execution system, apparatus, or device.

Computer program code for carrying out operations of the present invention may be written in an object oriented programming language, such as Java, Smalltalk, C++, etc. However, the computer program code for carrying out operations of the present invention may also be written in conventional procedural programming languages, such as the "C" programming language or similar programming languages. The program code may execute entirely on a single processor, on multiple processors that may be remote from each other, or as a stand-alone software package. When multiple processors are employed, one processor may be connected to another processor through a local area network (LAN) or a wide area network (WAN), or the connection may be, for example, through the Internet using an Internet service provider (ISP).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. As used herein, the term "coupled" includes both a direct electrical connection between blocks or components and an indirect electrical connection between blocks or components achieved using one or more intervening blocks or components.

According to various aspects of the present disclosure, techniques are employed that shorten a time associated with booting a stateless client computer system (e.g., a diskless client). As used herein, the term "stateless" refers to operating system (OS) states and not to other states such as basic input/output system (BIOS) settings, etc. As is also used herein, a stateless client includes a client that does not include a hard disk drive (HDD) and a client that includes an HDD that is not utilized to boot the client or otherwise maintain user unique data related to an OS. In general, the techniques are directed to a stateless client that accesses remote storage (e.g., a storage area network (SAN)) via a communication link (e.g., an Internet connection) to retrieve information (e.g., code and data) to boot an OS and execute applications associated with the client.

As is known, maintaining applications, data, and OSs at a centralized location facilitates easier management of the applications, data, and OSs by information technology (IT) personnel of an organization. For example, should a stateless client fail, data is not lost and the stateless client can be re-booted without re-imaging an HDD of the client. Unfortunately, a boot time of a conventional stateless client may be considerably longer than a conventional client that includes an HDD that is utilized to boot the client or otherwise maintain a state for the client. Moreover, when multiple conventional stateless clients are attempting to boot from a same remote storage, boot time of the clients may be delayed.

According to various embodiments of the present disclosure, a stateless client is configured to boot a virtual machine (VM) monitor (e.g., a Xen™ hypervisor or other client hypervisor) prior to booting an OS (at least a portion of which is located on remote storage) and retrieving user data. In this case, the VM monitor functions as a control program for the OS. Following booting of the VM monitor, the stateless client initiates booting the OS by accessing a first portion of the OS, which is stored in a first non-volatile memory (e.g., a flash memory) of the stateless client and accesses the remote storage (via a communication link) to retrieve a second portion of the OS (that includes state information for the OS).

As an alternative to employing a VM monitor, a basic input/output system (BIOS) may be configured to include a network stack that facilitates accessing a network. In this case, a client OS that is modified to employ iSCSI (for accessing the remote storage) may be employed in conjunction with the BIOS. In one or more embodiments, the communication link is an internet protocol (IP) compatible communication link, e.g., an Internet small computer system interface (iSCSI) link.

According to various aspects of the present disclosure, a technique for booting a stateless client (e.g., a diskless client) includes booting a virtual machine (VM) monitor on the client. Booting of an operating system (OS) for the client is initiated (using a first portion of the OS) and a remote storage (that stores a second portion of the OS that includes state information for the client) is accessed via a communication link. The VM monitor is stored in a non-volatile memory area (e.g., within a first non-volatile memory) of a memory subsystem of the client and the first portion of the OS (which does not include any state information for the OS) is stored in the non-volatile memory area (e.g., in the first non-volatile memory, a second non-volatile memory, or another non-volatile memory) of the client. Booting of the OS for the client is completed using the second portion of the OS. In this case, the VM monitor functions as a control program for the OS.

According to another aspect of the present disclosure, a stateless client includes a memory subsystem and a processor. The memory subsystem includes a non-volatile memory area (e.g., including at least a first non-volatile memory) and the processor is coupled to the memory subsystem. The processor is configured to boot a virtual machine (VM) monitor on the client. The VM monitor is stored in the non-volatile memory area of the client. The processor is further configured to initiate booting of an operating system (OS) for the client. A first portion of the OS is stored in the non-volatile memory area (e.g., in the first non-volatile memory or a second non-volatile memory) of the client. The first portion of the OS does not include any state information for the OS. The processor is also configured to access a remote storage via a communication link. A second portion of the OS is stored in the remote storage and includes state information for the OS. Booting of the OS for the client is completed using the second portion of the OS.

According to another embodiment of the present disclosure, a technique for booting a stateless client includes initiating booting of an operating system (OS) for the stateless client using a first portion of the OS that is stored in a non-volatile memory area of a memory subsystem of the stateless client. In this case, the first portion of the OS does not include any state information for the OS. A remote storage is accessed via a communication link using a basic input/output system (BIOS) that includes a network stack for the communication link. A second portion of the OS is stored in the remote storage and includes state information for the OS. Booting of the OS for the stateless client is completed using the second portion of the OS.

With reference to FIG. 1, a relevant portion of an example computer network 100 is illustrated that includes a stateless client 112 that includes a processor 102 (including one or more central processing units (CPUs)) that is coupled to a memory subsystem 108 (which includes an application appropriate amount of volatile and non-volatile memory), an input device 110 (e.g., a keyboard and a mouse), and a video card 104. The client 112 may also include a hard disk drive (HDD) (not shown) that is not utilized to boot the client 112. The video card 104 is coupled to a display 106 (e.g., a cathode ray tube (CRT) or a liquid crystal display (LCD)). The processor 102 may be, for example, coupled to an Internet service provider (ISP) 114 via a network interface card (NIC), such as an Ethernet card (not shown). The client 114 may be, for example, a laptop computer system, a notebook computer system, a smart phone, or a desktop computer system.

The client 114 may also take the form of a portable wireless device that is coupled to the Internet or an intranet via a wireless interface (e.g., IEEE 802.11). As is illustrated, the ISP 114 is coupled to another ISP 118 via a communication link 116 (e.g., an Internet connection). The ISP 118 facilitates communication between a server 120 (that is coupled to remote storage 124) and the client 112. When the computer network 100 corresponds to an intranet, the ISPs 114 and 118 may be omitted. While only one remote storage (e.g., a storage area network (SAN) that includes one or more solid state drives, such as magnetic media or flash memory) and one client are depicted in FIG. 1, it should be appreciated that the network 100 may include multiple clients and/or multiple remote storages.

Figure 2:
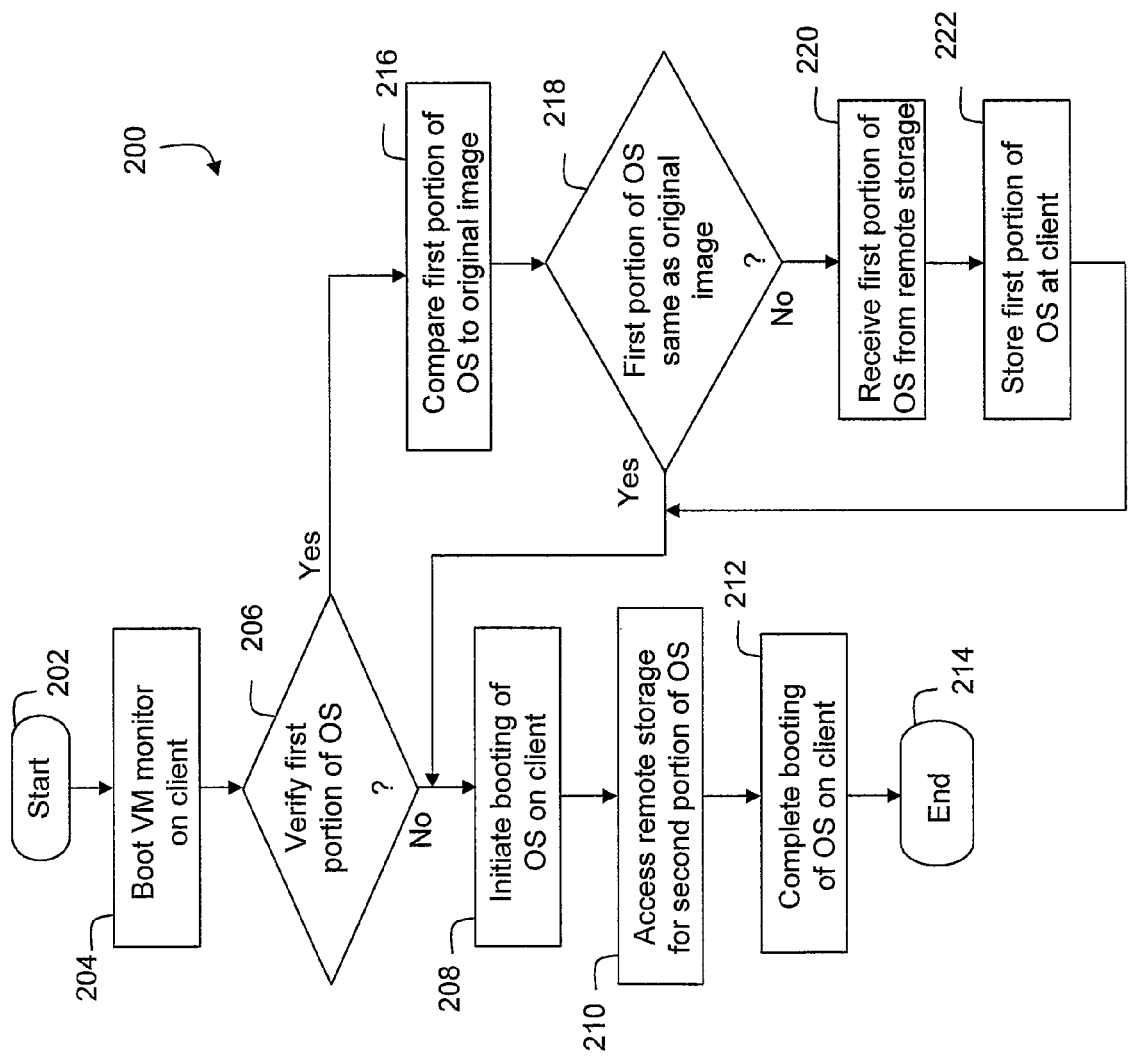
FIG. 2 is a flowchart of an example process for booting a stateless client, according to one or more embodiments of the present disclosure.

Moving to FIG. 2, an example boot process 200 for booting a stateless client (e.g., the client 112 of FIG. 1) is illustrated. To improve understanding, the process 200 is described in conjunction with the network 100 of FIG. 1. In block 202, the process 200 is initiated at which point control transfers to block 204 where the processor 102 boots a virtual machine (VM) monitor (e.g., a Zen™ hypervisor). Next, in decision block 206, the processor determines whether verification of a first portion of an operating system (OS), which is stored in a non-volatile memory area (e.g., a flash memory) included in the memory subsystem 108, is warranted. For example, the verification process may be performed every fifty times that the client 112 is booted. If verification is indicated, control transfers from block 206 to block 216. In block 216, the first portion of the OS is compared to an original image of the first portion of the OS that is stored on the remote storage 124.

Next, in decision block 218, the processor 102 determines whether the first portions of the OS match. When the first portions of the OS match, control transfers from block 218 to block 208. When the first portions of the OS do not match, control transfers from block 218 to block 220. In block 220, the first portion of the OS is received (at the client 112) from the remote storage 124. Then in block 222, the first portion of the OS (that is received from the remote storage 124) is stored in the non-volatile memory area. Typically, the first portion of the OS does not include any state information or data for the OS of the client 112. Following block 222, control transfers to block 208. Alternatively, the processor 102 may initially boot entirely from the remote storage 124 and store the first portion of the OS in the non-volatile memory area for subsequent boot operations.

In block 206 when verification is not required, control transfers to block 208, where the processor 102 initiates booting (using the first portion of the OS that is stored in the non-volatile memory area) of the OS on the client 112. Next, in block 210, the processor 102 accesses the remote storage 124 to retrieve (e.g., using iSCSI commands) a second portion of the OS. Typically, the second portion of the OS includes information (e.g., state information and data) that is unique to the client 112. It should be appreciated that if the processor 102 completely processes the first portion of the OS prior to receiving the second portion of the OS the processor 102 stalls. However, even if the processor 102 stalls while booting the OS, a total time associated with booting the client 112 is still usually less than a total time encountered when booting a stateless client configured according to the prior art. In a typical implementation, the second portion of the OS is received prior to complete execution of the first portion of the OS. Next, in block 212, the processor 102 completes booting of the OS. Following block 212, control transfers to block 214 where the process 200 terminates.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. For example, the present techniques can be implemented in virtually any kind of system. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method, comprising:
    booting a virtual machine monitor on a stateless client, wherein the virtual machine monitor is stored in a non-volatile memory area of a memory subsystem of the stateless client and functions as a control program for an operating system for:
    initiating booting of the operating system for the stateless client, wherein a first portion of the operating system is stored in the non-volatile memory area of the memory subsystem of the stateless client, and wherein the first portion of the operating system does not include any state information for the operating system;
    accessing a remote storage via a communication link, wherein a second portion of the operating system is stored in the remote storage and includes state information for the operating system; and
    completing booting of the operating system for the stateless client using the second portion of the operating system.

2. The method of claim 1, wherein the first portion of the operating system also does not include any data for the stateless client.

3. The method of claim 1, wherein the second portion of the operating system also includes data for the stateless client.

4. The method of claim 1, wherein the communication link is Internet protocol compatible.

5. The method of claim 4, wherein the communication link is an Internet small computer system interface link.

6. The method of claim 1, wherein the virtual machine monitor is a XEN hypervisor.

7. The method of claim 1, wherein the remote storage includes one or more hard disk drives.

8. The method of claim 1, wherein the remote storage includes one or more solid state drives.

9. The method of claim 1, further comprising:
    verifying that the first portion of the operating system stored in the non-volatile memory area is the same as an original version of the first portion of the operating system that is stored on the remote storage.

10. The method of claim 9, further comprising:
    comparing the first portion of the operating system stored in the non-volatile memory area with the original version of the first portion of the operating system that is stored on the remote storage using a cyclic redundancy check.

11. The method of claim 1, further comprising:
    receiving the first portion of the operating system from the remote storage at the stateless client; and
    storing the first portion of the operating system in the non-volatile memory area prior to the initiating booting.

12. An apparatus, comprising:
    a memory subsystem including a non-volatile memory area;
    a processor coupled to the memory subsystem, wherein the apparatus is a stateless client and the processor is configured to:
        boot a virtual machine monitor on the stateless client, wherein the virtual machine monitor is stored in the non-volatile memory area of the memory subsystem and functions as a control program for an operating system to:
        initiate booting of the operating system for the stateless client, wherein a first portion of the operating system is stored in the non-volatile memory area of the memory subsystem, and wherein the first portion of the operating system does not include any state information for the operating system;
        access a remote storage via a communication link, wherein a second portion of the operating system is stored in the remote storage and includes state information for the operating system; and
        complete booting of the operating system for the stateless client using the second portion of the operating system.

13. The apparatus of claim 12, wherein the first portion of the operating system also does not include any data for the stateless client, and wherein the second portion of the operating system also includes data for the stateless client.

14. The apparatus of claim 12, wherein the communication link is Internet protocol compatible.

15. The apparatus of claim 14, wherein the communication link is an Internet small computer system interface link.

16. The apparatus of claim 12, wherein the virtual machine monitor is a XEN hypervisor.

17. The apparatus of claim 12, wherein the remote storage is selected from a group consisting of one or more hard disk drives and one or more solid state drives.

18. The apparatus of claim 12, wherein the processor is further configured to:
    verify that the first portion of the operating system stored in the first non-volatile memory is the same as an original version of the first portion of the operating system that is stored on the remote storage.

19. The apparatus of claim 12, wherein the processor is further configured to:
    receive the first portion of the operating system from the remote storage; and
    store the first portion of the operating system in the first non-volatile memory prior to the initiate booting.

20. A computer-readable storage medium including code embodied thereon, wherein the code is configured to:
    boot a virtual machine monitor on a stateless client, wherein the virtual machine monitor is stored in a non-volatile memory area of a memory subsystem of the stateless client and functions as a control program for an operating system to:
    initiate booting of the operating system for the stateless client, wherein a first portion of the operating system is stored in the non-volatile memory area of the memory subsystem of the stateless client, and wherein the first portion of the operating system does not include any state information for the operating system;
    access a remote storage via a communication link, wherein a second portion of the operating system is stored in the remote storage and includes state information for the operating system; and
    complete booting of the operating system for the stateless client using the second portion of the operating system.

21. The method of claim 20, wherein the communication link is an Internet small computer system interface link.

22. The method of claim 20, wherein the code is further configured to:

verify that the first portion of the operating system stored in the non-volatile memory area is the same as an original version of the first portion of the operating system that is stored on the remote storage.

23. The method of claim 22, wherein the code is further configured to:

compare the first portion of the operating system stored in the non-volatile memory area with the original version of the first portion of the operating system that is stored on the remote storage using a cyclic redundancy check.

* * * * *